United States Patent [19]

Klemmer

[11] Patent Number: 4,689,678
[45] Date of Patent: Aug. 25, 1987

[54] GRADATION DISTORTION COMPENSATION BY FET PRE-EMPHASIS CIRCUIT OPERATING IN FET SATURATION REGION

[75] Inventor: Wolfram Klemmer, Pfungstadt, Fed. Rep. of Germany

[73] Assignee: Robert Bosch GmbH, Stuttgart, Fed. Rep. of Germany

[21] Appl. No.: 670,157

[22] Filed: Nov. 9, 1984

[30] Foreign Application Priority Data

Nov. 18, 1983 [DE] Fed. Rep. of Germany ....... 3341667

[51] Int. Cl.$^4$ .............................................. H04N 5/20
[52] U.S. Cl. ...................................... 358/164; 358/33
[58] Field of Search ................. 358/164, 32, 169, 171, 358/172, 160, 166, 168, 170, 184, 163; 307/290, 359, 490, 494, 497, 492; 328/142, 144, 145

[56] References Cited

U.S. PATENT DOCUMENTS 3,845,326 10/1974 Godden ............................... 358/164
4,393,406 7/1983 Lehmann ............................ 358/160

FOREIGN PATENT DOCUMENTS 0048874 3/1982 Japan .................................... 358/160

OTHER PUBLICATIONS

R. G. Nelson, "Automatic Thresholding and Shading Circuit for Solid-State Cameras and Scanners" IBM Tech. Disclosure, vol. 17, #2, pp. 519-520, 7/74.

Primary Examiner—James J. Groody
Assistant Examiner—David E. Harvey
Attorney, Agent, or Firm—Frishauf, Holtz, Goodman & Woodward

[57] ABSTRACT

A video signal as it comes from a camera is inverted and clamped to an adjustable voltage for the black level and then proceeds at an amplified level to a differential amplifier that applies a signal to the gate of an N-channel FET. The voltage source provides a positive voltage through a load resistor and the drain-source path of the FET in series, while the drain electrodes is fed back through the differential amplifier in phase opposition to the incoming video, causing the drain current to vary in the same way as the video signal voltage. The applied voltage and the load resistor are such as to operate the FET in its saturation region, with the result that the gate voltage which is the voltage at the output of the differential amplifier, has the desired square root curve characteristic for correcting the gradation distortion of the picture tube. If a P-channel FET is used, the polarity of the voltage supply is reversed and the video is applied to the differential amplifier non-invertedly and clamped low rather than high. A potentiometer adjusts the clamping level to obtain the desired value of the gradation slope (gamma).

4 Claims, 8 Drawing Figures

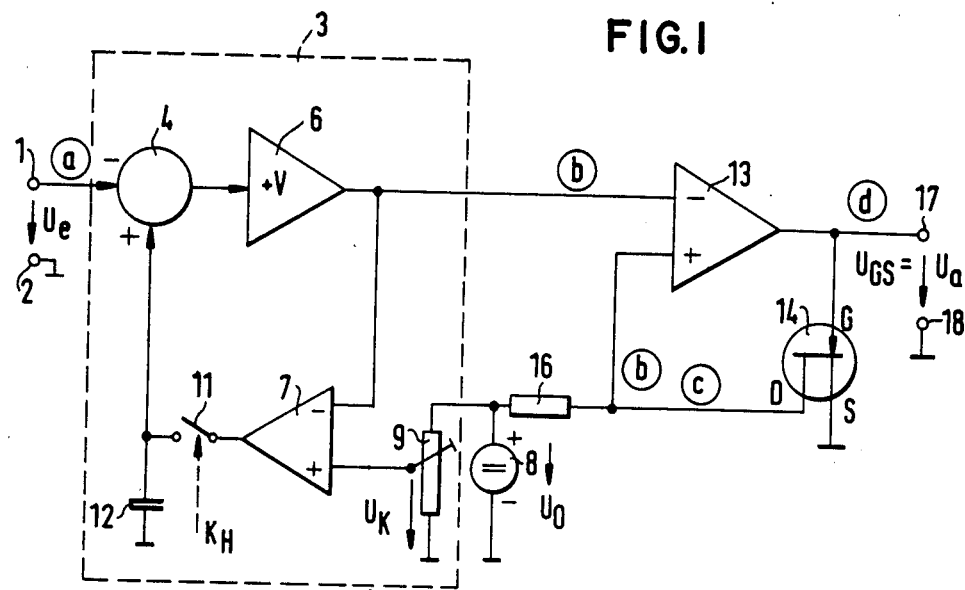
FIG.1
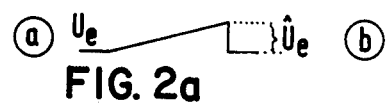 
FIG. 2a    FIG. 2b
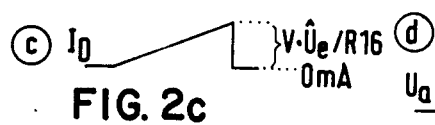 
FIG. 2c    FIG. 2d
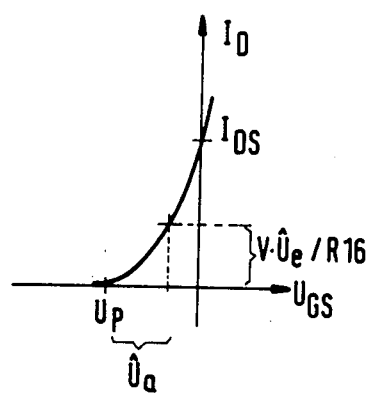
FIG. 3

GRADATION DISTORTION COMPENSATION BY FET PRE-EMPHASIS CIRCUIT OPERATING IN FET SATURATION REGION

This invention concerns a method and a circuit for predistortion of video signals of a composite television signal, usually referred to as pre-emphasis, for compensating the curving of the picture tube gradation characteristic in a television system. That gradation characteristic is approximately a square law curve. In order to compensate for this quadratic characteristic of picture tube brightness and thereby obtain reproduction of the scale of brightness steps in correct gradation, the television signal is subjected in the camara, or as it comes from the camera, to a circuit with a correspondingly opposed non-linear transfer characteristic.

In Dillenburger, "Einführung in die Fersehtechnik", line 2, 1969, pp. 344,345, circuits are disclosed in which the television signal, after suitable amplification, is passed through a network of resistances and semiconductor diodes. A semiconductor diode can in this case be driven as a switch, so that a characteristic results that consists of segments respectively having slopes rising with different steepness. That provides, however, only a coarse approximation to the desired transfer characteristic that runs in a manner corresponding to a square-root characteristic.

A good approximation to the desired curve is obtained if a semiconductor diode, instead of being used as a switch, is used as a resistance providing a voltage drop that runs exponentially with respect to the current flowing through the diode.

In the last mentioned known circuit, it is necessary for the signal to be amplified to a sufficiently high degree in a following amplifier. That has the disadvantage that frequency distortion and linearity errors can occur.

Furthermore, the d.c. voltage value of the output voltage of the following amplifier must not be subjected to fluctuations that, for example, could result from temperature changes, in order to assure that the correct part of the diode characteristic is utilized. Furthermore, the voltage-dependent capacitances exhibited by the diodes operate in connection with the voltage dividing resistances as low-pass filters, so that the bandwidth of the signals to be transmitted is substantially cut down.

In an article entitled "Ein regelbarer Videoverstärker mit Gradationsentzerrung im Farbfernsehen mit einem Feldeffekttransistor als Regelelement" by L. P. de Young, Issue 6 of 1976 of the periodical NTZ, pp. 325–328, there is disclosed still another known circuit for video preemphasis. In this case the drain-source path of a field effect transistor is connected as a controlled voltage divider resistance. The N-channel blocking layer field effect transistor used in this case is operated in the ohmic region (i.e., $|U_{DS}| < |U_{GS} - U_p|$), so that the conductivity of the drain-source path is proportional to the control voltage.

This last-mentioned known circuit has a disadvantage because the working characteristic of the field effect transistor is not fitted to the desired gamma characteristic (as the gradation characteristic is called). In particular, there is noted an exaggeration of the differential amplification in the gray region. This known circuit has the disadvantages of the known circuits utilizing diodes, because the corrected television signal at the output of the circuit is relatively small and has a low-pass characteristic because of the parasitic capacitances of the FET operated in the manner described.

SUMMARY OF THE INVENTION

It is an object of the present invention to provide a method and a circuit apparatus for gradation-correction pre-emphasis of television signals of such quality that a television signal of a high definition television system operating with about four times the bandwidth of conventional systems can be effectively gamma-corrected.

Briefly, a field effect transistor operating in the saturation region is used to correct the gamma characteristic of the picture tube by using the quadratic transfer characteristic of such a field effect transistor in an inverted way, a differential amplifier with its inverting input to output path interposed in the path of the video signal having its output connected in series with the gate to source path of the FET and its non-inverting input being connected to the drain electrode of the FET, which is also connected through a series resistor to a substantially constant voltage source. The video signal as it goes to the differential amplifier is clamped at a suitable voltage equal to or less than the supply voltage in terms of absolute magnitude. When the FET is an N-channel device, the video signal supplied to the differential amplifier is inverted and clamped relatively high, whereas in the case of a P-channel FET, the video signal supplied to the differential amplifier is non-inverted and clamped relatively low.

The invention has the advantage that a substantially larger signal bandwidth can be handled compared with what could be done with heretofore conventional methods. Since, furthermore, the transfer characteristic obtained fits the desired gamma characteristic in a distinctly better way than was the case with the heretofore known methods, a much smaller emphasis of noise in the important gray range is obtained by the invention. Furthermore, there is a symmetrical circuit behavior under control with pulse-shaped signals, since the storage time of the diodes used in earlier circuits is absent.

It is particularly significant that no following amplifier is needed, because the output voltage range of the circuit of the invention resulting from the threshold voltage of the usual field effect transistors is very great. The shape of the characteristic curve can be adjusted by the clamping potential. It is possible to obtain higher beginning steepnesses than could be produced before. The imposition of a fixed drain current at the instant when the signal represents a black value also produces a good behavior pattern under temperature fluctuations.

BRIEF DESCRIPTION OF THE DRAWINGS

The invention is further described by way of illustrative example with reference to the annexed drawings, in which:

FIG. 1 is a circuit of one embodiment according to the invention for carrying out the method of the invention;

FIGS. 2(a), 2(b), 2(c) and 2(d) are correspondingly drawn graphs of wave forms occurring at the same time in various parts of the circuit of FIG. 1;

FIG. 3 is a graph of the transfer characteristic of the field effect transistor used in the circuit of FIG. 1;

DESCRIPTION OF THE ILLUSTRATED EMBODIMENTS

Figure 4:
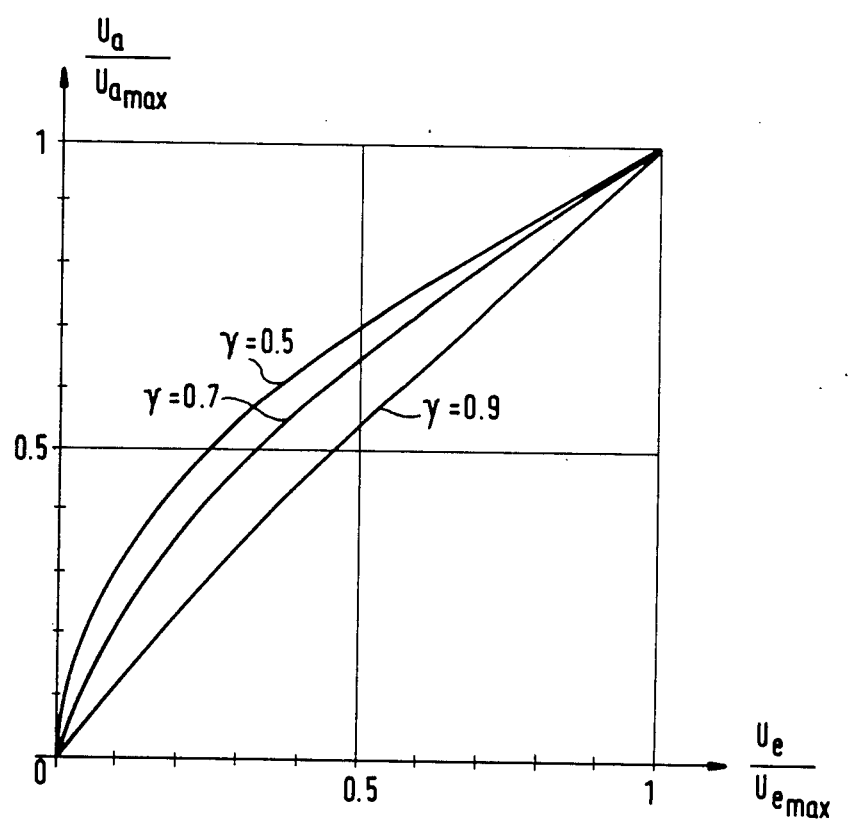
FIG. 4 is a graph of a few gamma characteristics for which the circuit of FIG. 1 can be adjusted for different settings of the potentiometer of FIG. 1.

At the input terminals 1 and 2 of FIG. 1, there is provided a broadband video signal which is to be corrected by a desired amount of gradation predistortion (pre-emphasis). This signal is shown in FIG. 2(a) for the case of a linearly rising ramp for illustrating the type of pre-emphasis occurring in later stages of the circuit.

The signal (a) goes from the inputs terminals 1 and 2 to a clamping stage 3 with a backward-acting clamp keyed by line-scanning-frequency. In this clamping stage 3, the signal is inverted as well as clamped. The clamping stage 3 contains an inverter stage 4 in the video signal path to which there is contemporaneously supplied the clamping potential $U_K$ stored in the capacitor 12 between operations of the pulsed switch 11. The clamping stage 3 also contains an amplifier stage 6 for amplifying the inverted and clamped video signals, at the outputs of which a signal (d) appears which is graphed in FIG. 2(b).

The signal (b) is supplied on the one hand to the inverting input of a differential amplifier 7 of the clamping circuit, the non-inverting input of which is supplied with a steady clamping potential $U_K$ derived from a voltage supply source 8 by means of a potentiometer 9. The output of the differential amplifier 7 is connected through a switch 11 operated by line synchronized clamping pulses, over to the clamping capacitor 12 and to the positive input of the inverter stage 4. During the blanking intervals of the video signal, the signal (b) is clamped to a fixed potential that is equal to the supply voltage $U_o$ for a value of $\gamma=0.5$ (referring to the usual gradation measure).

The video signal (b) is also supplied to the investing input of a second differential amplifier 13, which according to the invention, has the gate-drain path of a field effect transistor (FET) 14 of an N-channel blocking layer type connected between the output and the non-inverting input of this second differential amplifier. The FET 14 is operated in its saturation region, where $|U_{DS}| > |U_{GS}-U_p|$. The drain electrode of the FET 14 is connected to a series resistance (load resistance) with the positive pole of the supply voltage source 8.

As the result of the counter-coupling of the differential amplifier 13 by negative feedback produced by the gate drain path, the signal (b) also appears at the connection point of the drain electrode of the FET 14 and the non-inverting input of the differential amplifier 13. The drain current $I_D$ then follows the curve (c), which is proportional to the voltage of the signal (a).

In the clamping periods, i.e., during the transmission of the value of black, no drain current flows ($I_D=0$), so that the output voltage $U_a$ available at the terminals 17,18, which is equal to the gate-source voltage of the FET 14, is then adjusted to the value of the pinch-off voltage $U_p$ (see FIG. 3).

A linear rise of the input voltage $U_e$ produces a similar rise of the drain current (c) and at the same time the output voltage $U_a = U_{GS}$ runs through the square-root characteristic line corresponding to the video signal (d) shown in FIG. 2(d), which is produced out of the quadratic transfer characteristic of the FET 14 shown in FIG. 3 by inversion of that transfer characteristic.

FIG. 4 shows characteristics corresponding to different values of gamma ($\gamma$) which can be obtained by change of the clamping potential $U_k$ ranging from $\gamma=0.5$ for $U_k=U_o$ all the way up to a value of gamma approximately equal to 1.

Figure 5:
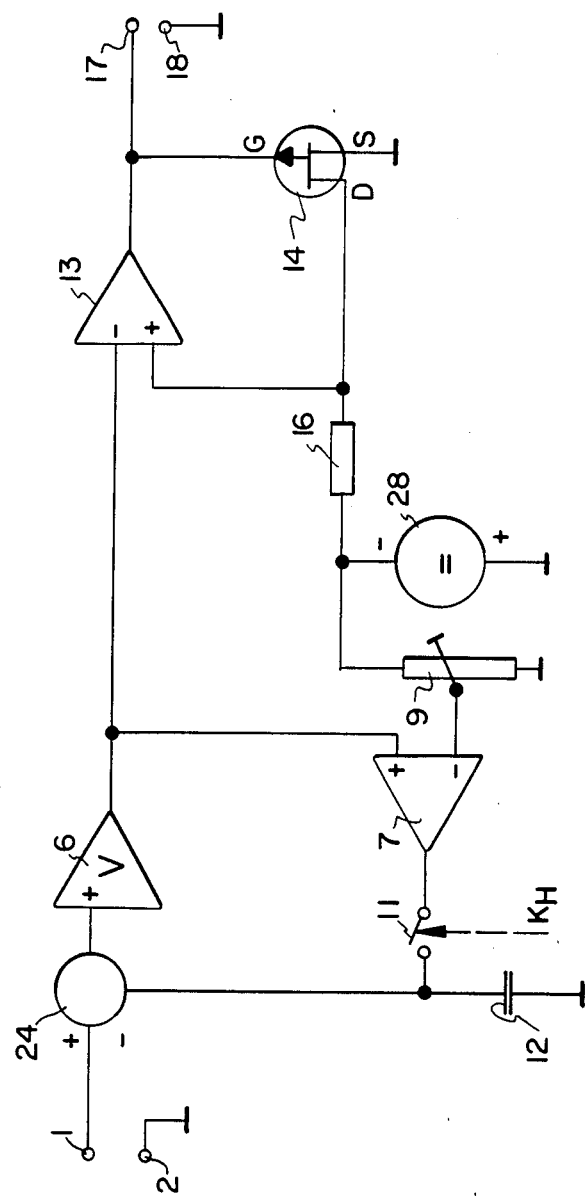
FIG. 5 is a circuit diagram of a second embodiment of the invention.

As shown in FIG. 5, instead of the blocking layer FET of the N-channel type used in FIG. 1, it is possible within the frame of the invention also to use other FET types without basically changing the circuit according to the invention. When FETs of P-channel types 4' are used, it is merely necessary to reverse the polarity of the supply voltage source 8 of FIG. 1 and to supply the video signal to the second differential amplifier 13 in an uninverted state. These differences are shown by the replacement of the inverter 4 by a inverter stage 24, by the provision of the voltage source 28 with polarity the reverse of that of the voltage source 8 <of FIG. 1.> and by replacement of differential amplifier 7 by amplifier 27.

Although the invention has been described with reference to particular illustrative embodiments, it will be understood that modifications and variations are possible within the inventive concept.

We claim:

1. Method of pre-emphasis of a television video signal to compensate for gradation distortion, comprising:
    operating a field-effect transistor in saturation to produce a quadratic transfer characteristic, with a constant supply voltage connected through a resistor in series with the source-drain path of said transistor;
    imposing the video signal as a voltage appearing across said series resistor and bucking said supply voltage, by operation of an active circuit driven by said video signal and connected between the gate electrode and a junction of said resistor and another electrode of said transistor, the video signal being applied to the active circuit with a polarity for utilizing inversely the quadratic transfer characteristic of said field effect transistor operating in said saturation, and
    obtaining a pre-emphasized video signal at said gate electrode of said transistor, and output connection of said active circuit being also combined to said gate electrode.

2. Electric circuit apparatus for gradation-distortion-compensating pre-emphasis of a television video signal, in a transmission path of said signal comprising;
    a field effect transistor (14) having gate, drain and source electrodes;
    a resistor (16) connected between said drain electrode and a constant supply voltage source, said transistor source electrode being connected to a reference voltage to which said supply voltage source is also connected, and
    a differential amplifier (13) having an output, an inverting input and a noninverting input, the gate-drain path of said field effect transistor being connected between the output and the non-inverting input of said differential amplifier, and the path from the inverting input to the output of said differential amplifier being interposed in said transmission path of said television video signal.

3. Apparatus according to claim 2, in which said field effect transistor is an N-channel field effect transistor, wherein said inverting input of said differential amplifier is supplied with the video signal in inverted form, and means are provided for clamping said video signal, in inverted form, to an adjustable potential absolutely smaller than or equal to the potential of said supply voltage source.

4. Apparatus according to claim 2, in which said field effect transistor is a P-channel field effect transistor, wherein said inverting input of said differential amplifier is supplied with the video signal in noninverted form, and means are provided for clamping said video signal to an adjustable potential absolutely smaller than the potential of said supply voltage source.

* * * * *